United States Patent
McGreer et al.

(10) Patent No.: US 12,247,911 B2
(45) Date of Patent: Mar. 11, 2025

(54) APPARATUS FOR ARTIFICIAL WEATHERING COMPRISING TWO KINDS OF LIGHT EMISSION SOURCES

(71) Applicant: ATLAS Material Testing Technology GmbH, Linsengericht-Altenhaßlau (DE)

(72) Inventors: Matt McGreer, Mt Prospect, IL (US); Oliver Rahäuser, Linsengericht-Altenhaßlau (DE); Jörn Jahnke, Linsengericht-Altenhaßlau (DE)

(73) Assignee: ATLAS Material Testing Technology GmbH, Linsengericht-Atlenhassalu (DE)

( * ) Notice: Subject to any disclaimer, the term of this patent is extended or adjusted under 35 U.S.C. 154(b) by 345 days.

(21) Appl. No.: 17/710,186

(22) Filed: Mar. 31, 2022

(65) Prior Publication Data

US 2022/0357002 A1    Nov. 10, 2022

(30) Foreign Application Priority Data

May 4, 2021  (EP) .................................... 21172040

(51) Int. Cl.
*G01N 17/00* (2006.01)
*F21S 8/00* (2006.01)
*F21Y 113/00* (2016.01)
*F21Y 113/20* (2016.01)

(52) U.S. Cl.
CPC .......... *G01N 17/004* (2013.01); *F21S 8/006* (2013.01); *G01N 17/002* (2013.01); *F21Y 2113/20* (2016.08); *F21Y 2113/30* (2023.05)

(58) Field of Classification Search
None
See application file for complete search history.

(56) References Cited

U.S. PATENT DOCUMENTS

2005/0087768 A1   4/2005   March et al.
2006/0027761 A1   2/2006   Schonlein et al.
(Continued)

FOREIGN PATENT DOCUMENTS

CN    104345026 A    2/2015
JP    H0355782 B2    8/1991
(Continued)

OTHER PUBLICATIONS

"Plastics—Methods of exposure to laboratory light sources—Part 3: fluorescent UV lamps", ISO 4892-3:2013, Sep. 15, 2013, 5 pages.
"Test methods for paints—Part 7: Long-period performance of film—Section 8: Accelerated weathering (Exposure to fluorescent UV lamps)", 1999, 17 pages.
JIS K 5572: 2003, "Phthalate resin enamel", Mar. 20, 2015, 3 pages.
Decision of Rejection cited in JP2022-072561, mailed Sep. 12, 2023, 7 pages.
European Search Report cited in EP21172040.4 mailed Sep. 30, 2021, 10 pages.
(Continued)

*Primary Examiner* — Eliza W Osenbaugh-Stewart
(74) *Attorney, Agent, or Firm* — Cooper Legal Group, LLC

(57) ABSTRACT

An apparatus for artificial weathering or lightfastness testing of samples comprises a weathering chamber, a first light source provided in the weathering chamber, the first light source comprising one or more fluorescent UV lamps each comprising an emission spectrum with a maximum wavelength below a predetermined wavelength, and a second light source provided in the weathering chamber, the second light source comprising one or more light emitting diodes each comprising an emission spectrum with a maximum wavelength above the predetermined wavelength.

20 Claims, 4 Drawing Sheets

(56) References Cited

U.S. PATENT DOCUMENTS

| | | | | |
|---|---|---|---|---|
| 2013/0306883 | A1* | 11/2013 | Lim | G01N 31/00 250/492.1 |
| 2014/0008551 | A1 | 1/2014 | Rudolph et al. | |
| 2015/0017731 | A1* | 1/2015 | Byun | G01N 17/004 422/82.05 |
| 2015/0068328 | A1* | 3/2015 | Rudolph | G01N 17/002 73/865.6 |

FOREIGN PATENT DOCUMENTS

| | | | |
|---|---|---|---|
| JP | 2005017132 | A | 1/2005 |
| JP | 2008139189 | A | 6/2008 |
| JP | 4471309 | B2 | 6/2010 |
| JP | 2014235151 | A | 12/2014 |
| JP | 2015025752 | A | 2/2015 |
| JP | 2018169342 | A | 11/2018 |
| JP | 2020064865 | A | 4/2020 |

OTHER PUBLICATIONS

Foyle, et al., "A simple artificial light system for solar simulated irradiation of polymeric materials", Review of Scientific Instruments 61, Nov. 1, 1990, vol. 6, No. 11, American Institute of Physics, pp. 3421-3424.

Nkama, et al., "Destruction of Aflatoxin B1, in Rice Exposed to Light", Journal of Cereal Science, Academic Press Ltd., GB, vol. 5, Jan. 1, 1987, 167-173.

"Environmental testing—Part 2-5: Tests—Test S: Simulated solar radiation at ground level and guidance for solar radiation testing and wearthering", IEC 60068-2-5: 2April 6, 2018, 28 pages.

First CN Office Action cited in CN202210478150.8 mailed Nov. 5, 2024, 8 pages.

Anonymous: "UV Nichia Corporation", May 23, 2022, pp. 1-11, XP093194833, https://led-ld.nichia.co.jp/en/product/uv_top.html.

EP Office Action cited in EP21172040.4, mailed Aug. 19, 2024, 5 pages.

* cited by examiner

APPARATUS FOR ARTIFICIAL WEATHERING COMPRISING TWO KINDS OF LIGHT EMISSION SOURCES

CROSS-REFERENCE TO RELATED APPLICATION

The present disclosure claims priority to European Patent Application 21172040.4, filed on May 4, 2021, which is incorporated herein by reference.

TECHNICAL FIELD

The present disclosure relates to an apparatus for artificial weathering or an apparatus for lightfastness testing, such apparatus comprising two kinds of light emission sources a first one of which comprising a fluorescent UV lamp and a second one of which comprising one or more light emitting diodes.

BACKGROUND

Artificial weathering or sunlight simulator apparatuses are intended to estimate the lifetime of materials which are constantly exposed to natural weather conditions during their use, and which therefore suffer from climatic effects such as sunlight, solar heat, moisture and the like. In order to obtain a good simulation of the natural weathering situation, the spectral energy distribution of the light generated in the device should correspond as closely as possible to that of natural solar radiation, for which reason xenon radiators are used as radiation sources in such devices. An accelerated ageing test of the materials is essentially achieved by much more intense irradiation of the samples compared with natural conditions, which speeds up the ageing of the samples. In this way, a prediction of the long-term ageing of a material sample can be made after a comparatively short time.

A large number of the samples studied in artificial weathering devices consist of polymeric materials. Their deterioration due to weathering is essentially caused by the UV component of solar radiation. The primary photochemical processes which take place during this, that is to say the absorption of photons and the generation of excited states or free radicals, are independent of temperature. The subsequent reaction steps with the polymers or additives, however, may be temperature-dependent so that the observed ageing of the materials is also temperature-dependent.

A xenon lamp is normally used as the radiation source in the weathering testers of the prior art. Although such a lamp is known to be able to simulate the solar spectrum very well, the emitted radiation nevertheless has a relatively high spectral component in the infrared spectral range, which needs to be suppressed by filters in order to prevent excessive heating of the samples. Furthermore, a commercially available xenon radiation source only has a lifetime of about 1500 hours.

For these and other reasons there is a need for the present disclosure.

SUMMARY

An aspect of the present disclosure relates to an apparatus for artificial weathering or lightfastness testing of samples, the apparatus comprising a weathering chamber, a first light source provided in the weathering chamber, the first light source comprising one or more fluorescent UV lamps each comprising an emission spectrum with a maximum wavelength below a predetermined wavelength; and a second light source provided in the weathering chamber, the second light source comprising one or more light emitting diodes, each one of the light emitting diodes comprising an emission spectrum with a maximum wavelength above the predetermined wavelength.

The predetermined wavelength could be, for example, 360 nm as currently there are no satisfactorily working LEDs available below 360 nm. It is therefore intended to fill the gap which cannot be covered by LEDs with fluorescent lamps. However, depending on the available LEDs the cut over between the two kinds of UV sources can also be at another wavelength like, for example, 350 nm or 380 nm.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

The present disclosure will be explained in more detail below with reference to exemplary embodiments in conjunction with the figures of the drawing, in which.

DETAILED DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

In the following detailed description, reference is made to the accompanying drawings, in which are shown by way of illustration specific aspects in which the disclosure may be practiced. In this regard, directional terminology, such as "top", "bottom", "front", "back", etc. may be used with reference to the orientation of the figures being described. Since components of described devices may be positioned in a number of different orientations, the directional terminology may be used for purposes of illustration and is in no way limiting. Other aspects may be utilized and structural or logical changes may be made without departing from the concept of the present disclosure. Hence, the following detailed description is not to be taken in a limiting sense, and the concept of the present disclosure is defined by the appended claims.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements or layers co-operate or interact with each other regardless whether they are in direct physical or electrical contact, or they are not in direct contact with each other which means that there can be one or more intermediate elements disposed between them. Also, the term "exemplary" is merely meant as an example, rather than the best or optimal. The following detailed description, therefore, is not to be taken in a limiting sense, and the scope of the present disclosure is defined by the appended claims.

Figure 1A:
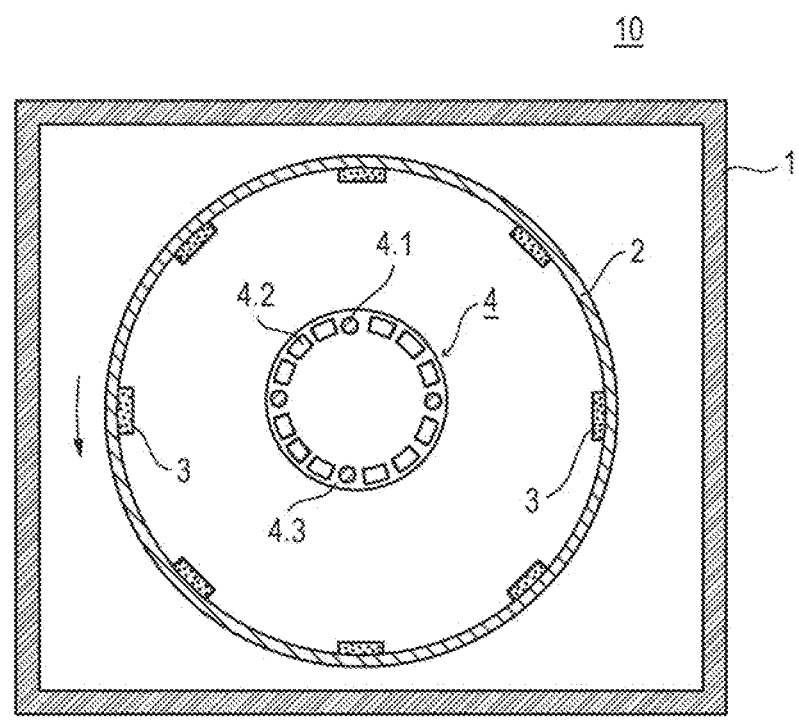
FIG. 1 comprises FIG. 1A to 1C and shows a horizontal cross-sectional down view of an example of an apparatus for artificial weathering, the apparatus being of the dynamic type with rotating samples (A), a perspective view (B) and a lateral cross-sectional view (C) of a radiation module comprising LEDs and fluorescent lamps.
Figure 1B:
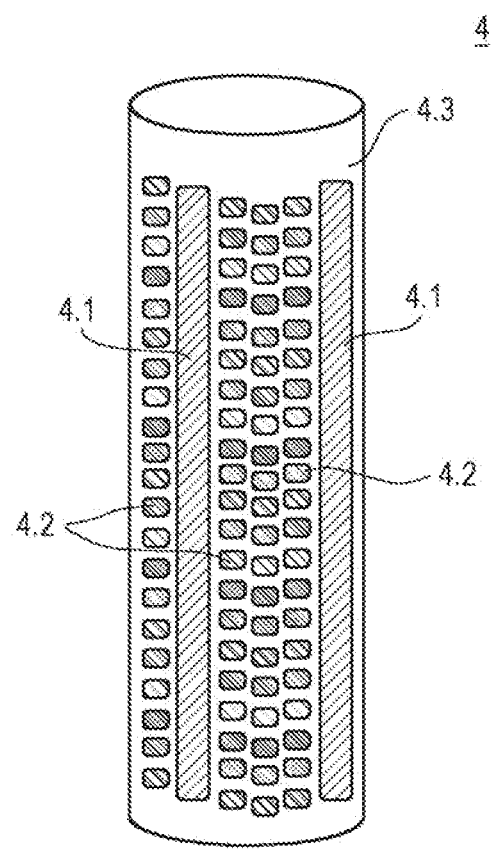
Figure 1C:
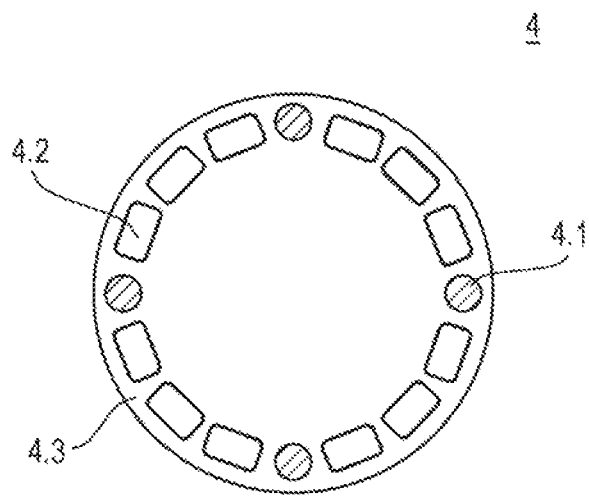

FIG. 1 comprises FIG. 1A to 1C and shows an apparatus according to the present disclosure for the artificial weathering of samples (A) and a radiation module for use in such an apparatus (B, C).

The apparatus 10 of FIG. 1 comprises a weathering chamber 1 and a holding frame 2 which is mounted so that it can rotate in the weathering chamber 1. The holding frame 2 comprises a closed ring shape and samples 3 or workpieces can be held on appropriate holding platforms or sockets provided on the holding frame 2. The holding frame 2 can have, in particular, a cylindrical form and a circular lateral cross section.

The apparatus 10 of FIG. 1 further comprises a radiation module 4 comprising first light sources 4.1 in the form of fluorescent UV lamps 4.1. The fluorescent UV lamps 4.1 may comprise an emission spectrum with a maximum wave-length below 360 nm. The apparatus 10 of FIG. 1 further comprises second light sources 4.2 in the form of a plurality of light emitting diodes (LEDs) 4.2. The LEDs 4.2 may each comprise an emission spectrum with a maximum wavelength above 360 nm. In particular, the LEDs 4.2 may be spectrally located at a number of different spectra from 360 nm up to 1100 nm or even higher.

The fluorescent UV lamps 4.1 can be of the same type and can have nominally identical emission spectra.

The fluorescent UV lamps 4.1 may, for example, comprise emission spectra in the UV-A range as, for example, a maximum emission wavelength of 351 nm or 340 nm. The fluorescent UV lamps 4.1 may alternatively comprise an emission spectrum in the UV-B range as, for example, a maximum emission wavelength of 313 nm. It is also possible to use two or more fluorescent UV lamps with different emission spectra as, for example, two or more lamps with each one comprising one of the above mentioned emission spectra.

The fluorescent UV lamps 4.1 may comprise a mercury vapor lamp, in particular a low-pressure mercury vapor lamp. More specifically, the fluorescent UV lamps 4.1 may comprise a glass or quartz bulb filled with mercury vapor. The pressure inside the lamp may be around 0.3% of atmospheric pressure. It may also be possible that the bulb is filled with another gas, in particular one of argon, xenon, neon, or krypton, or a mixture between at least two of these gases, possibly together with mercury. It is important that in operation of the lamp the excited gas is able to emit at least one strong UV line with a wavelength below 300 nm.

The inner surface of the bulb is coated with a fluorescent coating made of varying blends of metallic and rare-earth phosphor salts. The spectrum of light emitted from the fluorescent lamp is the combination of light directly emitted by the mercury vapor, and light emitted by the phosphorescent coating. For the purpose of the present disclosure it is important to select a phosphor salt that it able to emit a fluorescence spectrum that is located spectrally at the short wave UV rising edge of the solar spectrum which will be shown later in greater detail.

As can be seen in greater in FIGS. 1B and 1C, the radiation module 4 further comprises a hollow glass or quartz cylinder 4.3 to which the fluorescence lamps 4.1 and the LEDs 4.2 are attached on an inner surface thereof. The glass or quartz cylinder 4.3 serves the purpose to protect the light sources from humidity and possibly also to filter the light/radiation to the requested spectral distribution.

As mentioned above the LEDs 4.2 may comprise different emission spectra so that a superimposed spectrum of the fluorescent UV lamp(s) 4.1 and the LEDs 4.2 approximates the spectrum of solar light. The LEDs 4.2 may comprise any desired number of different emission spectra like, for example, 4 to 10 or even more different emission spectra. The LEDs 4.2 could be electrically connected in series. However, it is also possible to power each emission type of LEDs 4.2 separately so that the superimposed spectrum can be adjusted to the individual requirements.

FIG. 3 shows wavelength-intensity diagrams for illustrating the simulation of the solar spectrum in the visible and infrared range (A) and additionally in the UV range (B).

Figure 3A:
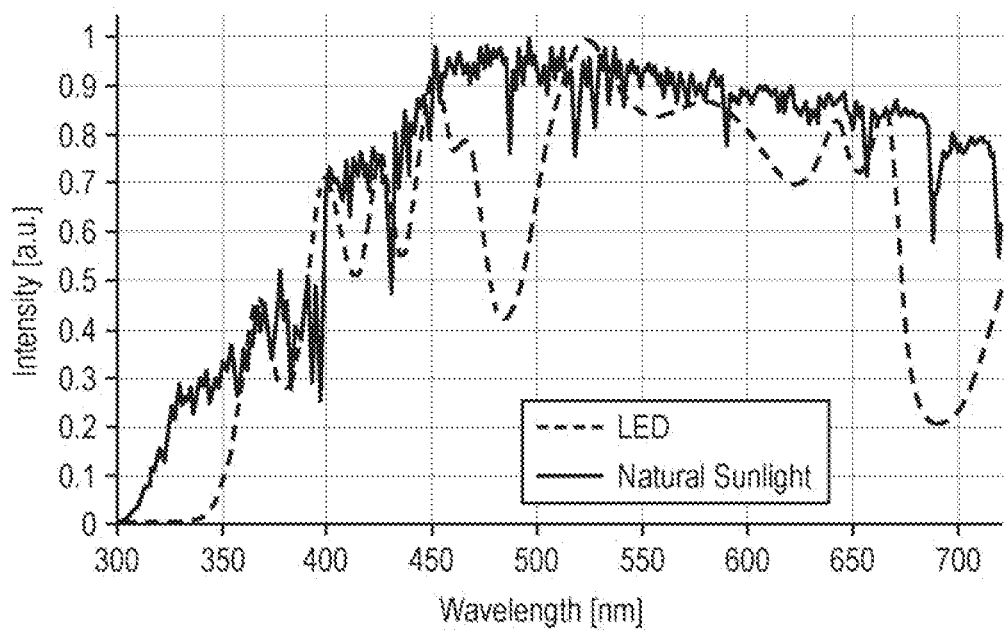
FIG. 3 comprises FIGS. 3A and 3B and includes wavelength-intensity diagrams showing the spectrum of the natural sunlight together with the superimposed emission curves of a plurality of LEDs (A) and an enlarged short wavelength part thereof showing in addition the emission curve of a fluorescence UV lamp (B).

The wavelength-intensity diagram of FIG. 3A shows the spectrum of the natural sunlight (solid line) together with the superimposed emission curves of a plurality of LEDs (dashed line). It can clearly be seen that the plurality of LEDs only cover the wavelength range over 360 nm so up to a wavelength of 750 nm. Further LEDs could be employed to match the solar spectrum up to 1100 nm or even higher. Due to the fact that no LED below 360 nm is employed there is a UV gap between 295 and 350 nm.

Figure 3B:
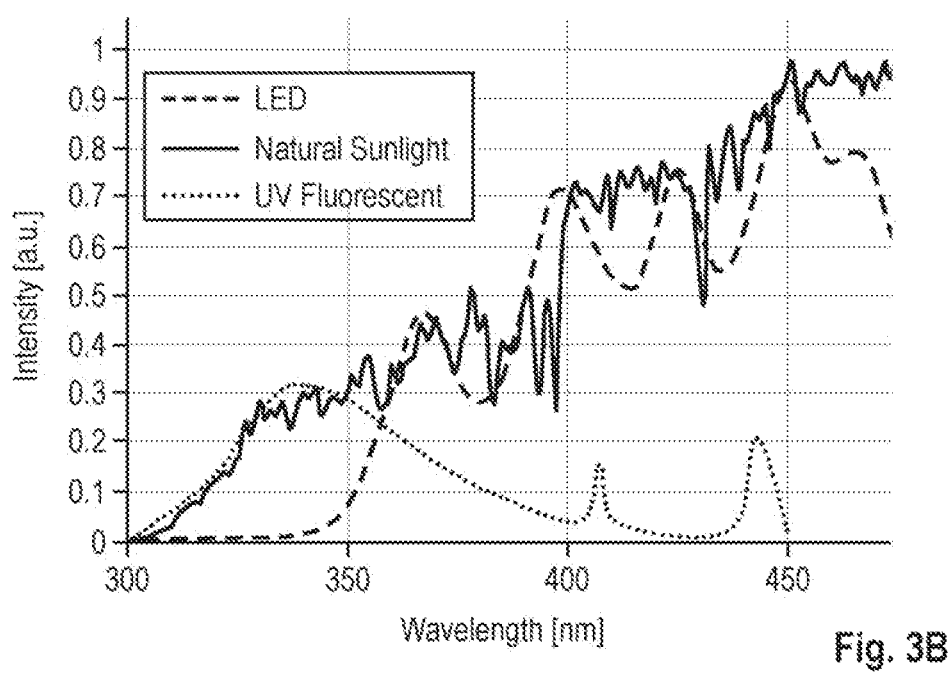

The wavelength-intensity diagram of FIG. 3B shows how this UV gap is filled. FIG. 3B shows an enlarged short wavelength part of the diagram of FIG. 3A and it shows in addition the emission curve of a fluorescence UV lamp (dash-dotted line) which emission curve comprises a maximum at about 340 nm and thus perfectly fills the UV gap between 295 and 350 nm. It can be seen that in the falling edge of the emission curve a UV-LED is spectrally placed with a maximum at 367 nm and with increasing wavelength more LEDs are employed in order to approximate at least part of the solar spectrum.

Hence a superposition curve of the LED curve and the UV fluorescent curve may be such that it at best approximates the Natural Sunlight Curve. The approximation could be defined mathematically by calculating an integral, i.e. an area below the curve, of both the superposition curve and the natural sunlight curve between two wavelength values, e.g. 300 nm and 500 nm, 600 nm, 700 nm, 800 nm, or 900 nm, and then calculating the difference between both area values. Then a maximum value of the difference could be defined like, e.g. 20%, 10%, or 5% of the higher one of the two area values. If the value of the difference is less than this maximum value then the superposition curve is found to satisfactorily approximate the natural sunlight curve.

In a manner which is known per se, the weathering chamber 1 may also have other artificial weathering instruments, for example moisture generators or the like, although these do not play an essential part in the present disclosure and will not therefore be discussed in detail. Only as an example to produce condensation a heated reservoir in the bottom of the weathering chamber may produce water vapor that rises up to an upper chamber where the samples will be exposed to the UV radiation and get uniformly wetted at 100% relative humidity. As another example, an air flow may also be blown into the weathering chamber 1 and sweep past the samples 3.

Figure 2A:
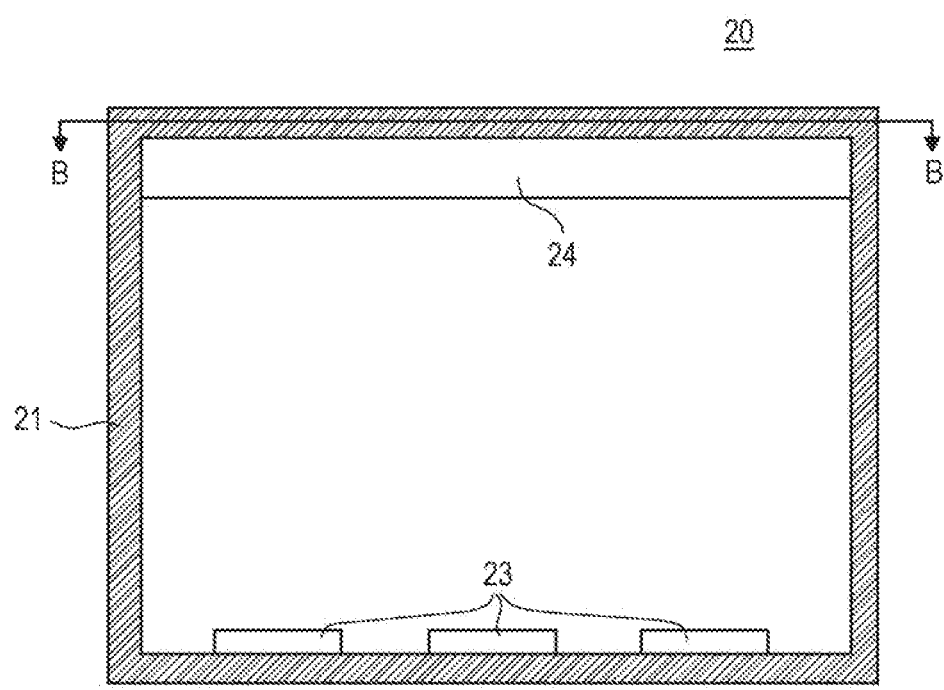
FIG. 2 comprises FIGS. 2A and 2B and shows a vertical cross-sectional view of an apparatus for artificial weathering according to the present disclosure, the apparatus being of the static type with fixed samples (A), and a down view of a radiation module taken at line B-B of FIG. 2A.
Figure 2B:
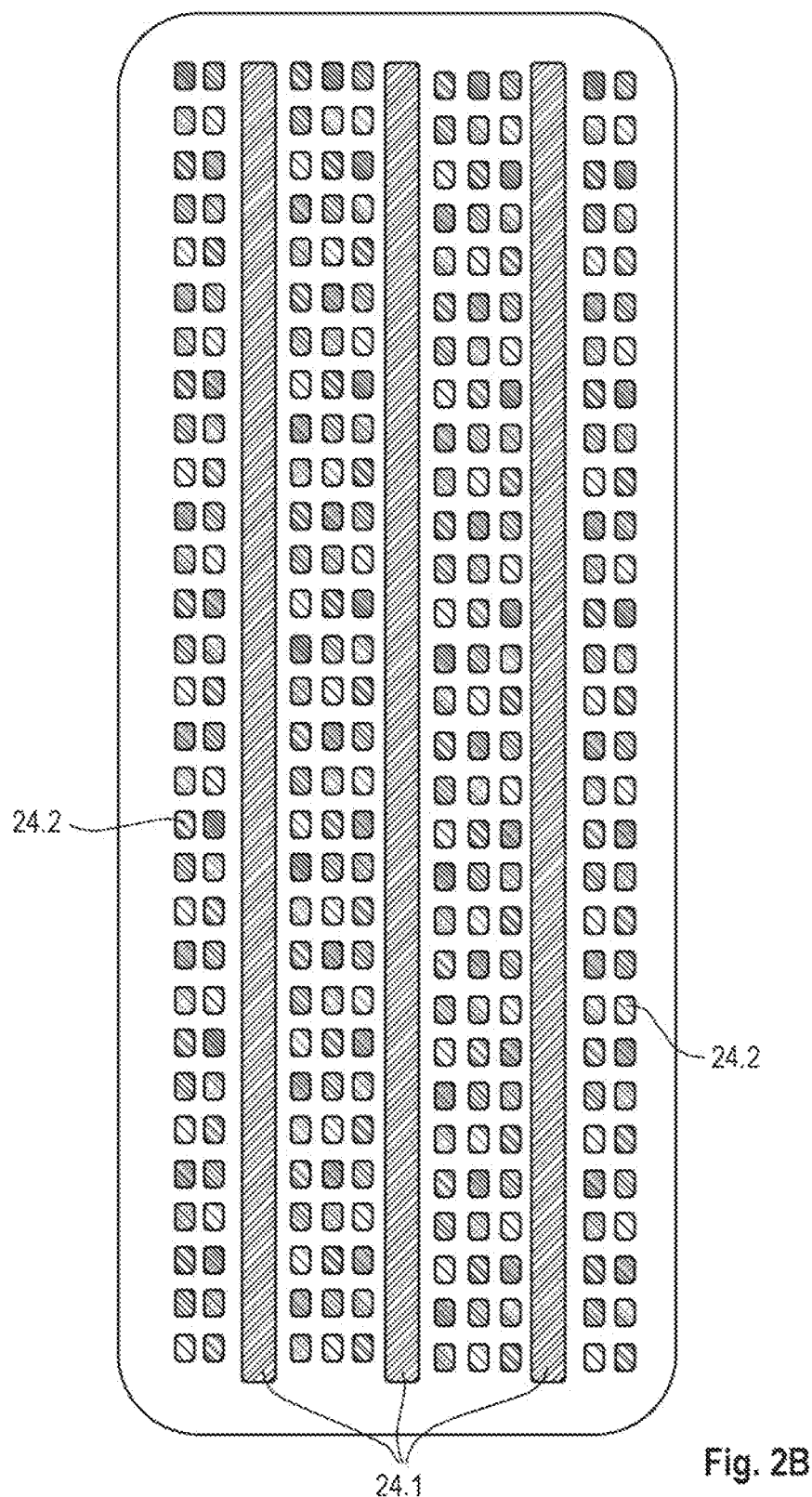

FIG. 2 comprises FIGS. 2A and 2B and shows an example of an artificial weathering device of the static type with fixed samples (A) and a view on the radiation module mounted in the weathering device (B).

The apparatus 20 for artificial weathering as shown in FIG. 2 comprises a weathering chamber 21 which is configured so that a plurality of samples 23 or work-pieces can be arranged on a bottom surface of the weathering chamber 21. The apparatus 20 of FIG. 2 further comprises a radiation module 24 comprising fluorescent lamps 24.1 and LEDs 24.2. In a way similar to FIGS. 1B and 1C the fluorescent lamps 24.1 and LEDs 24.2 can be mounted on a glass or quartz plate which is mounted between opposing inner side walls of the weathering chamber 21.

The apparatus 20 may comprise further features similar to the ones which have already been explained in connection with the apparatus 10 of FIG. 1.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the concept of the following claims. In particular regard to the various functions per-formed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The invention claimed is:

1. An apparatus for artificial weathering or lightfastness testing of samples, the apparatus comprising:
   a weathering chamber; and
   no more than two light sources provided in the weather chamber, wherein:
      a first light source of the no more than two light sources consists of one or more fluorescent ultraviolet (UV) lamps each comprising an emission spectrum with a maximum wavelength below a predetermined wavelength; and
      a second light source of the no more than two light sources consists of one or more light emitting diodes each comprising an emission spectrum with a maximum wavelength above the predetermined wavelength.

2. The apparatus according to claim 1, wherein:
the emission spectrum of the first light source and the emission spectrum of the second light source are such that a superposition of the emission spectrum of the first light source and the emission spectrum of the second light source in a minimum distance from the first light source and the second light source approximates a solar spectrum.

3. The apparatus according to claim 2, comprising:
two or more fluorescent UV lamps comprising nominally equal emission spectra.

4. The apparatus according to claim 2, wherein:
the one or more light emitting diodes comprises emission spectra in at least one of a visible region or an infrared region.

5. The apparatus according to claim 2, wherein:
the one or more fluorescent UV lamps comprises one or more of a mercury lamp, a mercury low-pressure lamp, or a metal halide lamp.

6. The apparatus according to claim 2, wherein:
the apparatus is configured to rotate the samples around the first light source and the second light source.

7. The apparatus according to claim 1, comprising:
two or more fluorescent UV lamps comprising nominally equal emission spectra.

8. The apparatus according to claim 7, wherein:
the one or more light emitting diodes comprises emission spectra in at least one of a visible region or an infrared region.

9. The apparatus according to claim 7, wherein:
the one or more fluorescent UV lamps comprises one or more of a mercury lamp, a mercury low-pressure lamp, or a metal halide lamp.

10. The apparatus according to claim 7, wherein:
the apparatus is configured to rotate the samples around the first light source and the second light source.

11. The apparatus according to claim 1, wherein:
the one or more light emitting diodes comprises emission spectra in at least one of a visible region or an infrared region.

12. The apparatus according to claim 11, wherein:
the emission spectrum of the first light source and the second light source are such that a superposition of the emission spectrum of the first light source and the second light source in a minimum distance from the first light source and the second light sources approximates at least a portion of a visible region and an infrared region of a solar light spectrum.

13. The apparatus according to claim 12, wherein:
the one or more fluorescent UV lamps comprises one or more of a mercury lamp, a mercury low-pressure lamp, or a metal halide lamp.

14. The apparatus according to claim 11, wherein:
the one or more fluorescent UV lamps comprises one or more of a mercury lamp, a mercury low-pressure lamp, or a metal halide lamp.

15. The apparatus according to claim 11, wherein:
the apparatus is configured to rotate the samples around the first light source and the second light source.

16. The apparatus according to claim 1, wherein:
the one or more fluorescent UV lamps comprises one or more of a mercury lamp, a mercury low-pressure lamp, or a metal halide lamp.

17. The apparatus according to claim 1, wherein:
the apparatus is configured to rotate the samples around the first light source and the second light source.

18. The apparatus according to claim 17, wherein:
the first light source and the second light source are mounted on an inner wall of a hollow glass or quartz cylinder.

19. The apparatus according to claim 1, wherein:
the apparatus is configured to arrange the samples in a stationary manner.

20. The apparatus according to claim 19, wherein:
the first light source and the second light source are mounted on a surface of a glass or quartz plate.

\* \* \* \* \*